US010530662B2

(12) United States Patent
Ghosh et al.

(10) Patent No.: US 10,530,662 B2
(45) Date of Patent: Jan. 7, 2020

(54) MACHINE LEARNING METHOD TO VALIDATE RUN-TIME RULES AND DETECT SOFTWARE/HARDWARE CONSISTENCY ERRORS FOR NETWORK ELEMENTS

(71) Applicant: Cisco Technology, Inc., San Jose, CA (US)

(72) Inventors: Ankan Ghosh, San Jose, CA (US); Apurup Reddy Chevuru, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 61 days.

(21) Appl. No.: 15/977,082

(22) Filed: May 11, 2018

(65) Prior Publication Data
US 2019/0349263 A1 Nov. 14, 2019

(51) Int. Cl.
*G06F 15/177* (2006.01)
*H04L 12/24* (2006.01)
(52) U.S. Cl.
CPC ........ *H04L 41/145* (2013.01); *H04L 41/0873* (2013.01); *H04L 41/147* (2013.01); *H04L 41/16* (2013.01)
(58) Field of Classification Search
CPC ..... H04L 41/16; H04L 41/145; H04L 41/147; H04L 41/0873
USPC ........................................................ 709/221
See application file for complete search history.

(56) References Cited

U.S. PATENT DOCUMENTS 7,086,041 B2   8/2006  Plesko et al.
7,464,064 B1   12/2008 Smith
8,315,186 B2   11/2012 Talpade et al.
9,176,739 B2   11/2015 Steiss
9,619,315 B1*  4/2017  Brissette ............... G06F 11/079
9,706,016 B2   7/2017  Bharadwaj et al.
2014/0344453 A1* 11/2014 Varney ................ H04L 41/0803
                                                              709/224

(Continued)

OTHER PUBLICATIONS

Steinder, et al., "A survey of fault localization techniques in computer networks", Elsevier, Science of Computer Programming 53 (2004) 165-194, Jul. 1, 2004, 165 pgs.

(Continued)

*Primary Examiner* — Frantz B Jean
(74) *Attorney, Agent, or Firm* — Edell, Shapiro & Finnan, LLC

(57) ABSTRACT

A computer-implemented method includes: obtaining platform dependent data and platform independent data from each of a plurality of first network devices for a computer network environment. The received platform dependent data and platform independent data are converted to key-value pairs. Sequences of the key-value pairs representing the configurations and states of the respective first network device are created. Vectors for the sequences of the key-value pairs are generated in a vector space. The vectors are supplied to a model to train the model to learn relationships of the platform dependent data and platform independent data of each of the plurality of first network devices. Platform dependent data and platform independent data from one or more second network devices are supplied to the trained software model to determine consistency of configurations and states of the one or more second network devices.

20 Claims, 6 Drawing Sheets

(56) References Cited

U.S. PATENT DOCUMENTS

| | | | | |
|---|---|---|---|---|
| 2016/0078361 A1* | 3/2016 | Brueckner | .............. | H04L 67/10 |
| | | | | 706/12 |
| 2016/0127808 A1* | 5/2016 | Wong | ................ | G06F 16/24573 |
| | | | | 379/112.04 |
| 2017/0223036 A1* | 8/2017 | Muddu | ................. | G06F 16/254 |
| 2018/0027129 A1* | 1/2018 | Sharma | ............. | G06F 16/24573 |
| | | | | 379/112.09 |

OTHER PUBLICATIONS

Korvemaker, et al., "Predicting UNIX Command Lines: Adjusting to User Patterns", American Associate for Artificial Intelligence, Aug. 2000, 6 pgs.

Mikolov, et al., "Distributed Representations of Words and Phrases and their Compositionality", Advances in Neural Information Processing Systems, Oct. 16, 2013, 9 pgs.

* cited by examiner

MACHINE LEARNING METHOD TO VALIDATE RUN-TIME RULES AND DETECT SOFTWARE/HARDWARE CONSISTENCY ERRORS FOR NETWORK ELEMENTS

TECHNICAL FIELD

The present disclosure relates to validating run-time rules and detect software and hardware consistency errors of network devices.

BACKGROUND

A network includes a large number of network devices including switches, bridges, routers, gateways, etc. for communicating data. Each of these network devices needs to be configured properly in order to function correctly in a network environment. Particularly, each of the network devices has its own hardware and software that defines its functionality. Therefore, before the network devices can be deployed in the network and while they are deployed in a network, their configurations and states need to be checked to ensure they are in the correct settings.

In network devices, consistency checker (CC) utilities are implemented to validate software and hardware states/fields for network elements like Internet Protocol (IP) address, Media Access Control (MAC) address, interfaces, port aggregation configurations etc. CC utilities are useful to troubleshoot issues like failures and discrepancies in the traffic or hardware programming. These utilities are primarily used for initial debugging and are implemented separately for each type of network elements.

DESCRIPTION OF EXAMPLE EMBODIMENTS

Overview

Figure 1:
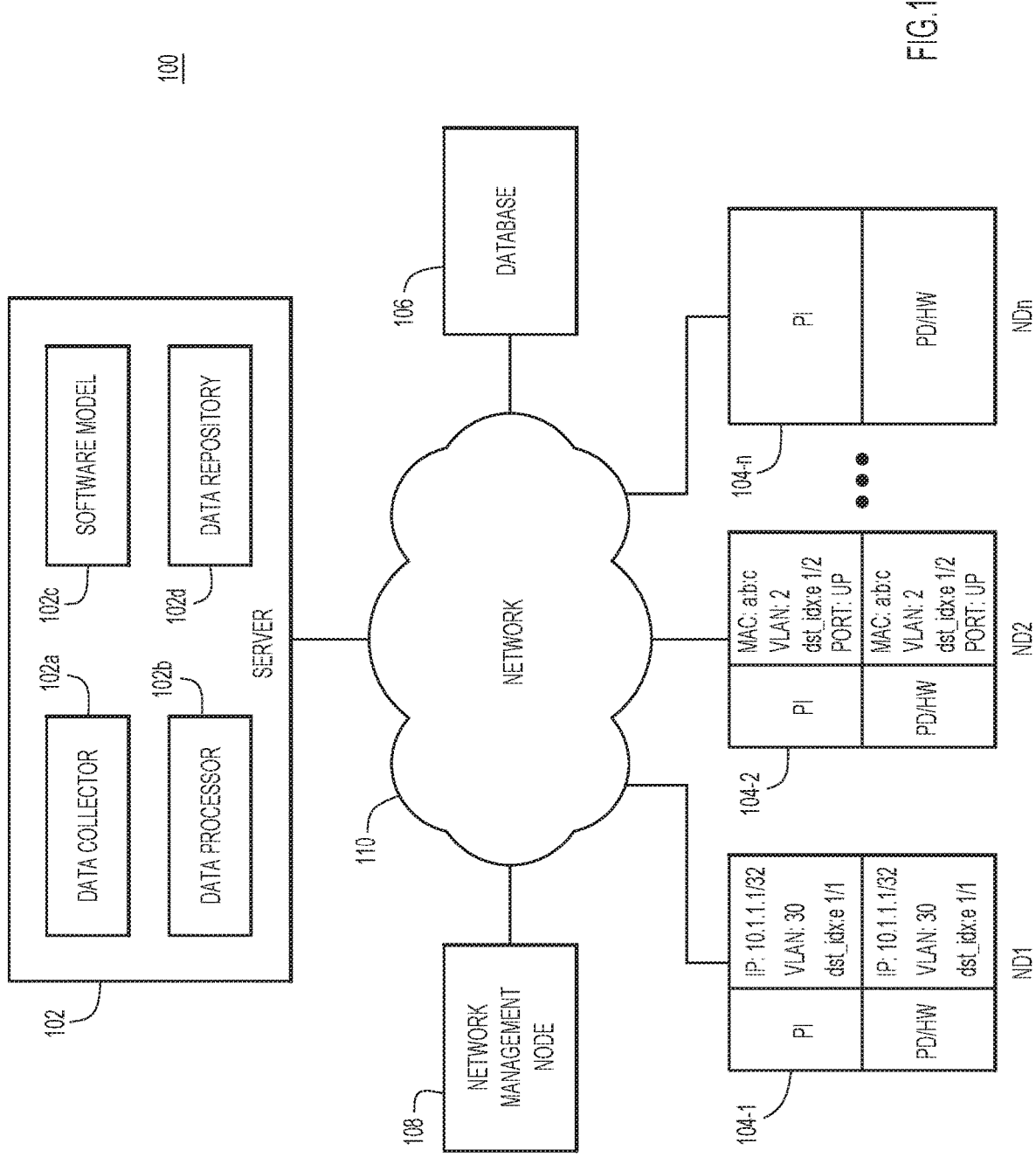
FIG. 1 depicts a network environment in which machine-learning techniques are employed to validate run-time rules and configurations of network devices in a network, according to an example embodiment.

In one embodiment, a method is provided for determining configurations and states of network devices in order to train a machine-learning model to check run-time rules and consistency of configurations of network devices. Platform dependent data and platform independent data are obtained from each of a plurality of first network devices for a computer network environment. The received platform dependent data and platform independent data are converted to key-value pairs. Sequences of the key-value pairs representing the configurations and states of the respective first network device are created. Vectors for the sequences of the key-value pairs are generated in a vector space. The vectors are supplied to a model to train the model to learn relationships of the platform dependent data and platform independent data of each of the plurality of first network devices. Platform dependent data and platform independent data from one or more second network devices are supplied to the trained software model to determine consistency of configurations and states of the one or more second network devices.

Example Embodiments

Presented herein are techniques for implementing a machine learning method to train a software model that can be used to determine configurations and states of network devices. Data that is used to train the software model can be acquired both from online sources, e.g., network devices deployed in the network, and from off line sources, e.g., a quality assurance database maintained by a data repository. The data may also include structured data, such as entire configurations and states of a network device, and unstructured data, such as discrete configurations and states of a network device. In one embodiment, the data that is used to train the software model may include platform independent data and platform dependent data. A Platform Independent (PI) module refers to a software module that is agnostic to the underlying hardware, whereas a Platform Dependent (PD) module understands the underlying hardware platform and takes care of programming all the relevant hardware tables (for that particular hardware platform) so that the configuration in the PI module takes effect. It is to be understood that other types of data associated with a network device may be used to train the software model.

In some embodiments, software and hardware states/status of network elements can be obtained through command line interfaces (CLIs). With less efforts of processing/parsing output from CLI that is formatted by, for example, Extensible Markup Language (XML), a generic supervised machine learning model can be trained to predict CC results for network elements. As used herein, a "network element" is an attribute of a networking feature or function of the network device. Examples of a "network elements" include IP addresses configured on an interface of the network device, MAC addresses configured on an interface, etc.

Relevant software and hardware fields/states that need to be validated for a given network element or combination of network elements are internal to a network device. Conventionally, this requires knowledge of internal code flow to define those fields and sequences in which they appear to satisfy run-time rules of a network device. To overcome this difficulty, in some embodiments, the disclosed techniques define those fields as keys/labels so as to process data from CLIs to obtain the fields and data associated with the fields. New CLIs can be added to data pools or used to enhance existing CLIs.

Associated states/fields for a given network element follow a critical code path and appear in respective CLIs to satisfy a set of run-time rules. For example, if an IP address that is associated with an interface whose state is up, then the IP address should also be present in the field of a table, such as a urib/ufib/ipfib/sdk/hw. In some embodiments, although the order of fields in a sequence may be arbitrary, a CLI for the respective network element would include this entry with some other set of inherent rules. In one embodiment, predefined CLI output in XML format can be obtained to validate a sequence of <key>-value pairs, which automatically conform to a set of rules, where values are disposed between respective fields/keys for a given network element. A key may be treated as a string input as it appears in the CLI output.

Reference is now made to FIG. 1 for a more detailed description of the above-described system and related methods. FIG. 1 depicts a computer network environment 100 in which the techniques for determining consistency of configurations and states of network devices can be applied, according to an example embodiment. The network environment 100 includes a server 102, a plurality of network devices ND1, ND2 . . . NDn at reference numerals 104-1-104-n, respectively, (and referred to collectively by reference numeral 104), a database 106, and network management node 108. The server 102 and the network devices 104 communicate with each other through a network 110. The network 110 may include any of a variety of network types, including a wide area network (WAN), local area network (LAN), wireless LAN (WLAN), Metropolitan Area Network (MAN), home network, wired or wireless network, etc. The number of devices in the network environment 100 are merely exemplary and are not meant to limit the scope of this disclosure. Any suitable number of servers, network devices, network management nodes, and databases may be used.

The network devices 104-1 to 104-n may stream network element data to the server 102 for collection and further analysis, as described below. For example, the Google protocol may be used to stream the network element data in a butter-based format.

The server 102 includes a data collector 102a, a data processor 102b, a software model 102c, and a data repository 102d. The data collector 102a is configured to collect data from the network devices 104 and database 106 through the network 110. In some embodiments, the data collector 102a is configured to collect configuration settings and states in CLIs of each of the network devices 104. The data collector 102a can also collect structured or unstructured configuration settings and states of the network devices 104 from the database 106. The collected data includes platform independent (PI) data and platform dependent (PD) data of the network devices 104. The collected data can be stored in the data repository 102d. The data processor 102b is configured to convert the received data of network devices 104 into a set of sequences each having a number of <key>-values pairs, which represent the configurations and states of a respective network device. In some embodiments, in a machine learning session, the data processor 102b is configured to assign a classification value to each of the sequences of <key>-values pairs. In some embodiments, the classification may be handled by a softmax classification. For example, a value "0" may indicate there is no issue with the configuration settings and states of network devices. A classification value "1" may indicate there is an issue with the platform independent settings and states of network devices, while a value "2" may indicate there is an issue with the settings and states of the hardware and/or software development kit of network devices. The sequences of <key>-value pairs and their associated classification values can also be stored in the data repository 102d.

The software model 102c is then trained using the sequences of <key>-values pairs and associated classification values. In one embodiment, the software model 102c may be a bi-directional recurrent neural network (RNN) with Long Short-Term Memory (LSTM) units (or gated recurrent units, GRU) and softmax classification. The software model 102c is trained to model the patterns of the sequences of <key>-values pairs and associated classification values. During the training process, data can be split into time series and supplied to input neurons of the RNN (shallow/deep depending on test accuracy) for predicting a classification value for any given configurations and states of one or more network devices. In some embodiments, after the training process, a testing process of the software model 102c can be employed to test the overall accuracy of the trained software model 102c for predicting whether configurations and states of one or more network devices are correct or include errors.

Network devices 104 may be switches, hubs, routers, bridges, modems, access points, gateways, etc. This is not meant to be limiting and the techniques presented herein may be applicable to any network device now known or hereinafter developed. Each of the network devices 104 is configured and provided with platform independent data and platform dependent data, which, in some embodiments, is related to the hardware components of a respective network device 104. Each of the network devices 104 may include application specific integrated circuits (ASICs) that perform networking functions based on configurations of network elements, and include memory to store the configuration settings and states including in the platform independent data and platform dependent data of the network device.

FIG. 1 shows an example of network element data on two network devices, ND1 and ND2. In this example, the network elements of ND1 include an IP address configured on an interface of the ND1 (IP: 10.1.1.1/32), a virtual LAN (VLAN) configured on an interface of the ND1 (VLAN: 30), and an ethernet interface configured on the ND 1 (dst_idx: e 1/1). The network elements of ND2 include a MAC address configured on an interface of the ND2 (MAC: a:b:c), a VLAN configured on an interface of the ND2 (VLAN: 2), an ethernet interface configured on the ND 2 (dst_idx: e 1/2), and a port status (Port: up). The parameters for the network elements illustrated in FIG. 1 are the configurations in platform independent data and what exactly is setup in hardware (PD) for the corresponding network element. In a clean/stable system, the platform independent data and platform dependent data should be in sync (the same) for all the relevant network elements, and this is what the machine learning model learns.

In some embodiments, the network devices 104 are configured to automatically upload their platform independent data and platform dependent data to the data collector 102a of the server 102, such as upon request from the server 102. In other embodiments, the network devices 104 upload their platform independent data and platform dependent data to the database 106 for storage. In one embodiment, each of the network devices 104 may include a data processor, similar to the data processor 102b, to process its platform independent data and platform dependent data before uploading.

The database 106 is configured to store structured platform independent data and platform dependent data of a network device 104, such as the entire configuration settings and states of the respective network device 104. The database 106 is also configured to store unstructured platform independent data and platform dependent data of the network devices 104, such as quality assurance data regarding the network devices 104.

The network management node 108 is configured to receive a trained software model to determine consistency of configurations and states of one or more network devices. For example, once the software is trained and tested at the server 102, the trained software model can be loaded to the network management node 108 remotely to validate run-time rules and configurations of new or updated network devices 104 deployed in the network 110. Similarly, the trained software model can be loaded to a network device to validate run-time rules and configurations.

Figure 2:
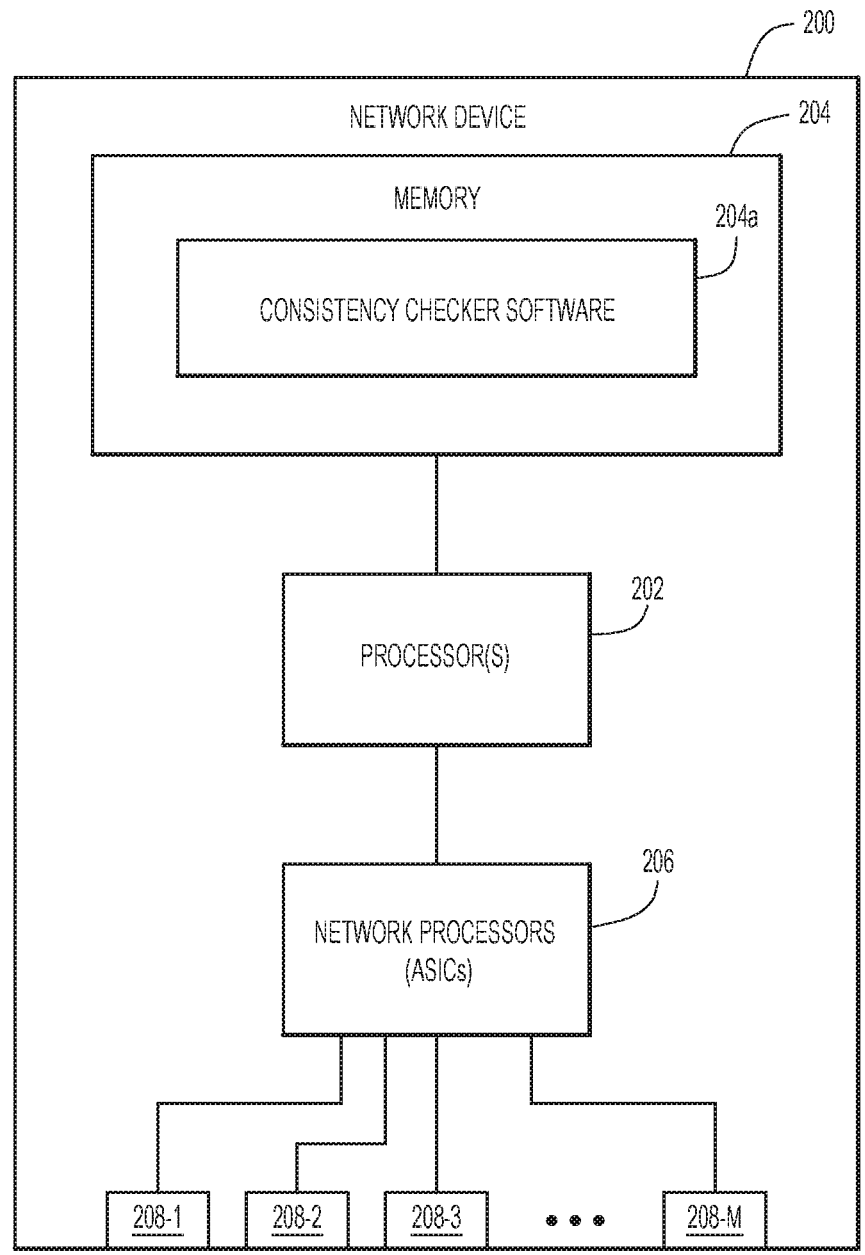
FIG. 2 depicts a block diagram of a network device for which the machine learning techniques may be employed for validating run-time rules and configurations, according to an example embodiment.

FIG. 2 depicts a high-level block diagram of a network device 200, according to an example embodiment. The network device 200 may be any one of the network devices 104 as shown in FIG. 1. As described above, the network device 200 may be a router, a bridge, a switch, a gateway, a modem, a hub, a repeater, or any other network device now known or hereinafter developed. The network device 200 includes one or more processors 202, a memory 204, network processors 206, and communication ports 208-1-208-m.

The processor 202 may be a microprocessor or microcontroller (or multiple instances of such components) that is configured to execute program logic instructions (i.e., software) for carrying out various operations and tasks described herein. For example, the processor 202 is configured to execute instructions for the consistency checker software 204ba stored in the memory 204. The consistency checker software 204b in one form is a trained software model for detecting and predicting errors/inconsistencies of configuration settings and states of network device 200. Further descriptions of operations performed by the processor 202 when executing instructions stored in the memory 204 will be provided below.

The memory 204 may include read only memory (ROM), random access memory (RAM), magnetic disk storage media devices, optical storage media devices, flash memory devices, electrical, optical or other physical/tangible memory storage devices.

The functions of the processor 202 may be implemented by logic encoded in one or more tangible (non-transitory) computer-readable storage media (e.g., embedded logic such as an application specific integrated circuit, digital signal processor instructions, software that is executed by a processor, etc.), wherein the memory 204 stores data used for the operations described herein and stores software or processor executable instructions that are executed to carry out the operations described herein.

The consistency checker software 204a may take any of a variety of forms, so as to be encoded in one or more tangible/non-transitory computer readable memory media or storage device for execution, such as fixed logic or programmable logic (e.g., software/computer instructions executed by a processor), and the processor 202 may be an application specific integrated circuit (ASIC) that comprises fixed digital logic, or a combination thereof.

For example, the processor 202 may be embodied by digital logic gates in a fixed or programmable digital logic integrated circuit, which digital logic gates are configured to execute the consistency checker software 204a. In general, the consistency checker software 204a may be embodied in one or more computer-readable storage media encoded with software comprising computer executable instructions and when the software is executed operable to perform the operations described herein.

The network processors 206 are integrated circuits, such as one ASICs, that are designed to perform networking-related tasks, such as receiving, processing, and forwarding packets in a network. The network processors 206 are coupled to and controlled by the processor 202. The network processors 206 include memories to store data, such as the platform dependent data and platform independent data depicted in FIG. 1. In some embodiments, the network processors 206 are configured to convert raw platform dependent data and platform independent data of the network device 200 into sequences of <key>-value pairs as described herein.

The communication ports 208-1-208-m are ports coupled to network processors 206 and configured to communicate packets to and from network device 200.

Figure 3:
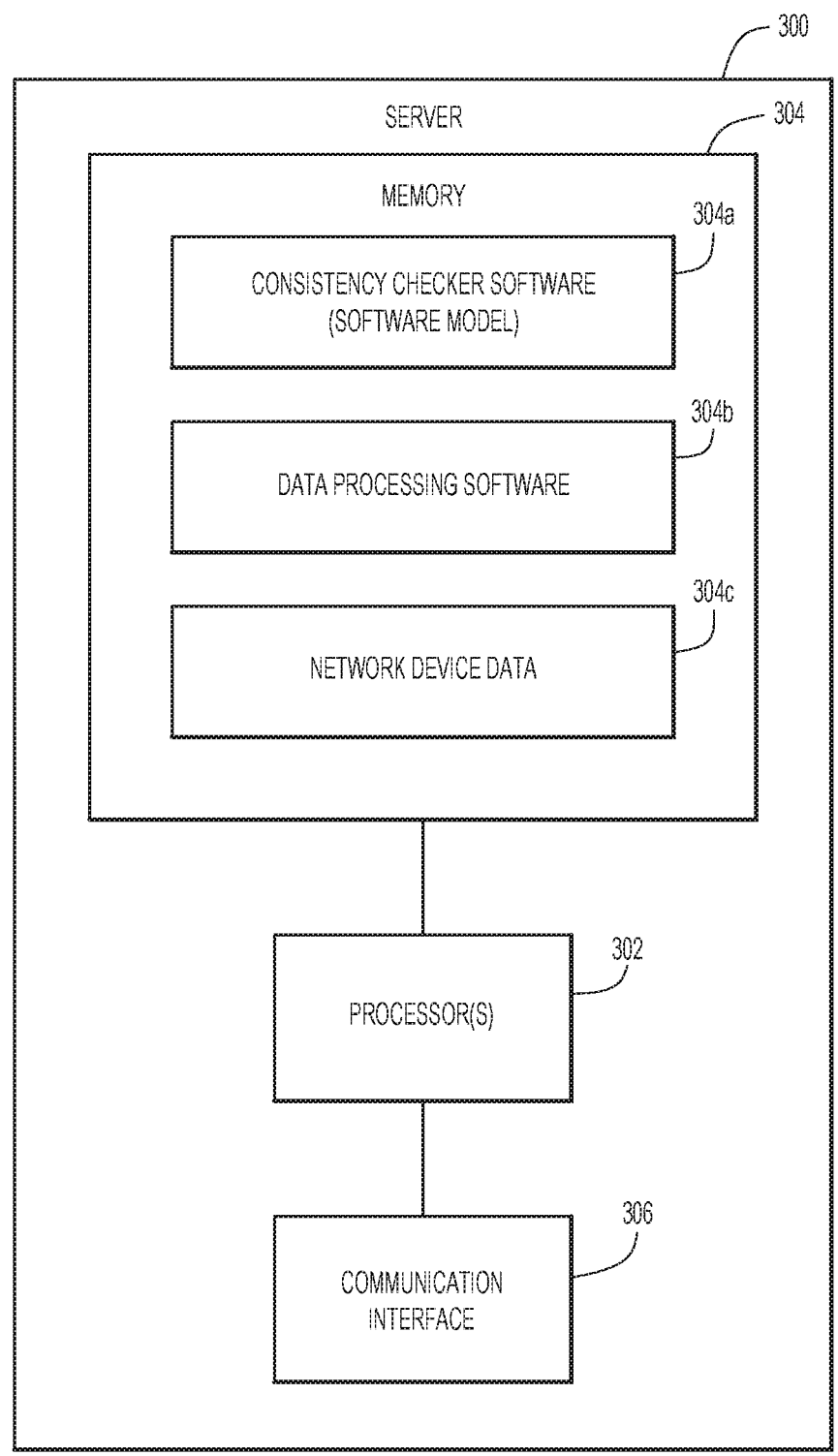
FIG. 3 depicts a block diagram of a server configured to execute the machine learning techniques to validate run-time rules and configurations of network devices, according to an example embodiment.

FIG. 3 depicts a block diagram of an example server 300, according to an embodiment. The server 300 can be the server 102 depicted in FIG. 1. As shown in FIG. 3, the server 300 includes a processor 302, a memory 304, and a communication interface 306. The processor 302 is a microprocessor or microcontroller that is configured to execute program logic instructions (i.e., software) for carrying out various operations and tasks described in this disclosure. For example, the processor 302 is configured to execute instructions for consistency checker software 304a and data processing software 304b stored in the memory 304. The processor 302 is configured to execute instructions for the data processing software 304b to perform data collection from network devices and/or database as a data collector (e.g., data collector 102a in FIG. 1), to process/convert the collected data into sequences of <key>-value pairs (e.g., data processor 102b in FIG. 1), to generate vectors for the sequences of <key>-value pairs, and to train a software model with the converted data set to create a trained software model. The trained software model is the consistency checker software 304a. The processor 302 is configured to execute instructions for the consistency checker software 304a to determine consistency of configurations and states of one or more network devices. Further description of the operations performed by the processor 302 executing instructions stored in the memory 304 will be provided below.

The memory 304 may include ROM, RAM, magnetic disk storage media devices, optical storage media devices, flash memory devices, electrical, optical or other physical/tangible memory storage devices. The memory 304 stores various software and data to be executed and accessed by the processor 302.

The functions of the processor 302 may be implemented by logic encoded in one or more tangible (non-transitory) computer-readable storage media (e.g., embedded logic such as an application specific integrated circuit, digital signal processor instructions, software that is executed by a processor, etc.), wherein the memory 304 stores data used for the operations described herein and stores software or processor executable instructions that are executed to carry out the operations described herein. As shown in FIG. 3, the memory 304 stores the consistency checker software 304a, the data processing software 304b, and network device data 304c of the network devices that is to be processed and converted into a proper format for training the software model.

The consistency checker software 304a and the data processing software 304b may take any of a variety of forms, so as to be encoded in one or more tangible/non-transitory computer readable memory media or storage device for execution, such as fixed logic or programmable logic (e.g., software/computer instructions executed by a processor), and the processor 302 may be an ASIC that comprises fixed digital logic, or a combination thereof.

For example, the processor 302 may be embodied by digital logic gates in a fixed or programmable digital logic integrated circuit, which digital logic gates are configured to perform the consistency checker software 304a and the data processing software 304b. In general, these logics may be embodied in one or more computer-readable storage media encoded with software comprising computer executable instructions and when the software is executed operable to perform the operations described herein.

The communication interface 306 is configured to transmit signals to or receive signals from the network 110 for the server 300. In one example, the communication interface 306 may take the form of one or more network interface cards. For example, the communication interface 306 may receive data packets from the network devices 104 and database 106 depicted in FIG. 1.

Figure 4:
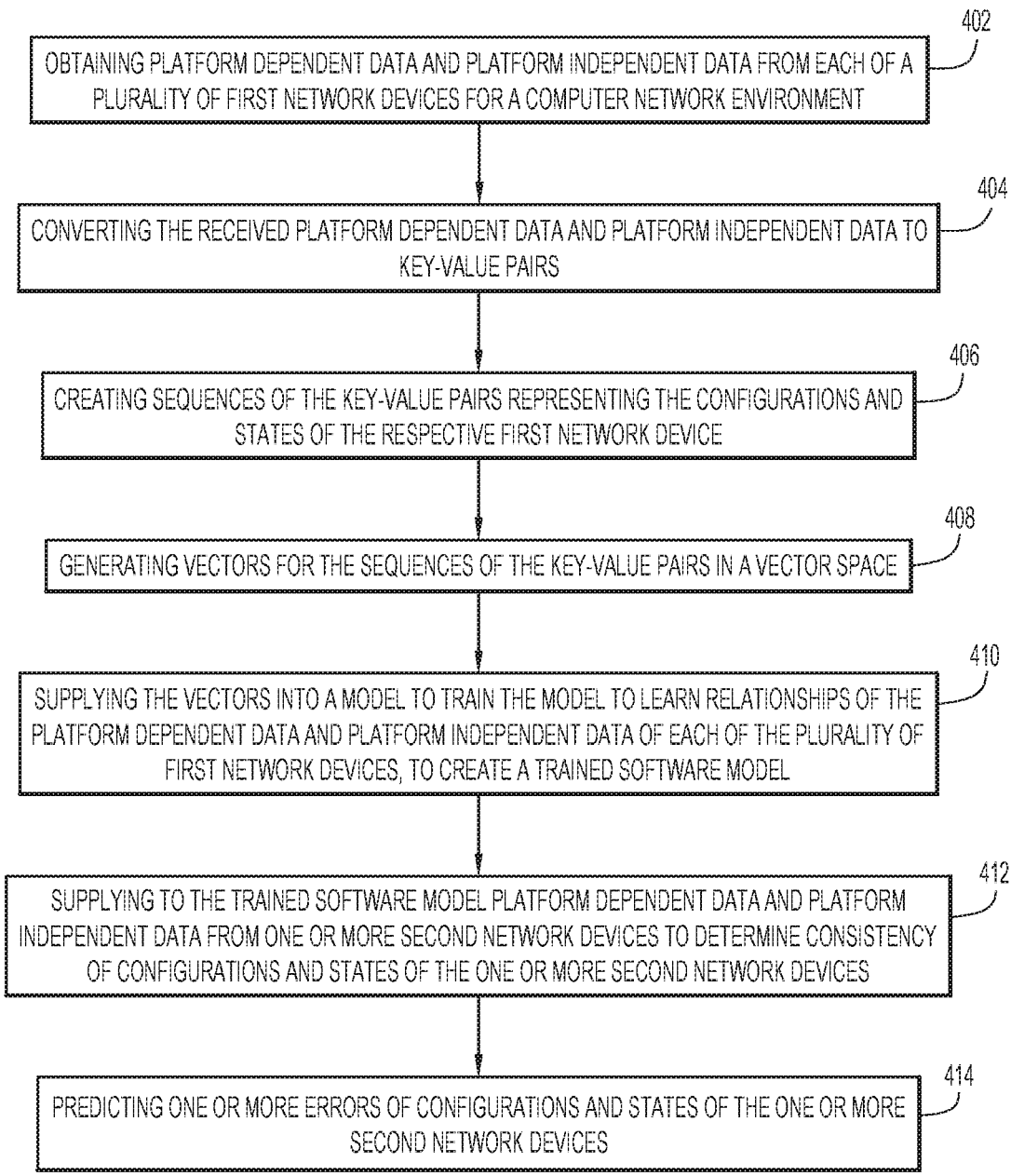
FIG. 4 is a high-level flow chart illustrating a method for determining consistency of configurations and states of one or more network devices, according to an example embodiment

Techniques presented herein enable a server or other computing apparatus to determine consistency of configurations and states of one or more network devices deployed in a network. With reference to FIG. 4 and continuing reference to FIGS. 1-3, an example method for determining consistency of configurations and states of one or more network devices is now described. FIG. 4 is a flow chart illustrating a method 400 performed by server 102 or other computing apparatus for determining consistency of configurations and states of one or more network devices, according to an example embodiment. At 402, the server obtains platform dependent data and platform independent data from each of a plurality of first network devices for a computer network environment. The platform dependent data and platform independent data indicate network device configurations and states of a respective first network device. The first network devices referred to in operation 402 are network devices from which the server will learn and therefore train a software model about network device configurations and states. These "first network devices" may be any network devices deployed or which have been deployed in a network environment and which have been programmed with a variety of networking configurations from which the system may learn. An example of the obtained data is provided below:

(config)# sh ip route 9.1.1.0/24|json
{"TABLE_vrf": {"ROW_vrf": {"vrf-name-out": "default", "TABLE_addrf": {"ROW_addrf": {"addrf": "ipv4", "TABLE_prefix": "ROW_prefix": [{"ipprefix": "9.1.1.0/24", "ucast-nhops": "1", "mcast-nhops": "0", "attached": "true", "TABLE_path": {"ROW_path": {"ipnexthop": "9.1.1.2", "ifname": "Eth1/9", "uptime": "PT1H22M38S", "pre f": "0", "metric": "0", "clientname": "direct", "ubest": "true"}}}.

At 404, the server converts the received platform dependent data and platform independent data to key-value pairs. For example, data of each network element can be mapped to a set of pre-defined CLIs and relevant XML or JavaScript Object Notation (JSON) keys representing the fields in the data. A set of XML tags can be used to classify sequence for a given network element. For example, if a network element value is given as "ip_address 9.1.1.0/24 vrf default," then the above obtained CLI data can be processed to find fields such as "vrf-name-out," "addrf," "ifname," and "attached." The data is parsed to determine a value for each key. Example <key>-value pairs may be expressed as "<if_sw_d-port> 120" "<if_hw_dport> 120", "<ip_brief> ip," and "<ip_hw_show> ip."

At 406, based on the key-value pairs, the server creates sequences of the key-value pairs representing the configurations and states of the respective first network device. Once the obtained data is converted into key-value pairs, the key-value pairs may be assembled into a string or sequence, which can also represent relationship between network elements. Example sequences are shown below:
1. <config> interface <ifname> eth1/1 <if_admin_state> up <if_oper_state> up <if_sw_dport> 120 <if_hw_dport> 120 <ip_brief> ip <ip_hw_show> ip—1 (correct)
2. <ip-addr> ip <vrf> vrf <config> interface <ifname> eth1 <if_admin_state> up <if_oper_state> up <if_sw_dport> 120 <if_hw_dport> 120 <ip_brief> ip <ip_hw_show> null—0 (incorrect)
3. <ifname> eth1/3 <if_admin_state> up <if_oper_state> up <if_sw_dport> 120 <if_hw_dport> 120—1 (correct)
4. <ifname> eth1/2 <if_admin_state> up <if_oper_state> up <if_sw_dport> 120 <if_hw_dport> 0—0 (incorrect)

A sequence of <key>-value pairs can be used to represent configurations and states of network elements of a network device. A sequence may include a plurality of <key>-value pairs. For example, in sequence 1 above, a key <if_admin_state> is associated with a value "up" while another key <if_sw_dport> is associated with a value 120. As described above, if a sequence is in a correct setting, it is given a classification value, e.g., 1 representing "correct" or 0 representing "incorrect." In the illustrated examples above, sequences 1 and 3 are given a classification value "1" to indicate the sequences of <key>-value pairs are correct, and sequences 2 and 4 are given a classification value "0" to indicate the sequences of <key>-value pairs are incorrect. In other embodiments, the classification value may be in another form, e.g., a, b, c, d, e, or 0-7, depending on the need for the classification. In one embodiment, arranging data in sequences as shown above and assigning an XML label as a <key> to the sequences of <key>-value pairs are achieved by machine learning techniques.

At 408, the server generates vectors for the sequences of the key-value pairs in a vector space. At 410, the server supplies the vectors into a model to train the model to learn relationships of the platform dependent data and platform independent data of each of the plurality of first network devices, to create a trained software model. In some embodiments, the trained software model learns relationships of a layer 2 networking parameter and a layer 3 networking parameter.

At 412, the server supplies to the trained software model platform dependent data and platform independent data from one or more second network devices to determine consistency of configurations and states of the one or more second network devices. The one or more second network devices may be new network devices to the network environment or existing network devices that have been reconfigured or updated, and it is desired to check or validate the network elements configured on the second network devices.

In some embodiments, a machine learning model is trained to capture prior and future context and sequences of key-value pairs to produce a final output, which can be a value, for example, 1 indicating a CC success or 0 indicating a CC failure.

In some embodiments, alternatively or additionally, at 414 the server predicts, based on operation of the trained software model on the platform dependent data and platform independent data from the one or more second network devices, one or more errors of configurations and states of the one or more second network devices.

Figure 5:
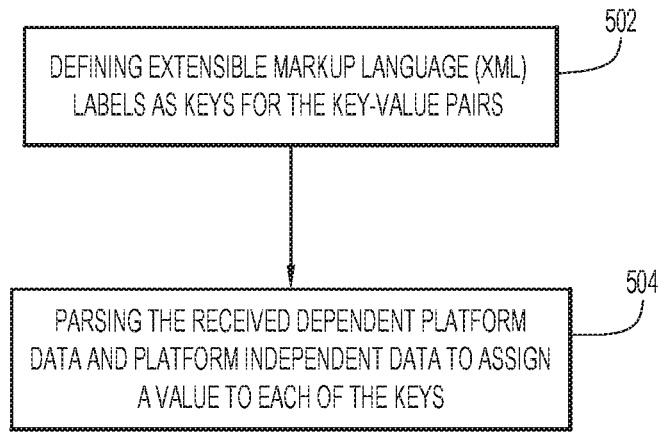
FIG. 5 is a flow chart illustrating a method to convert platform dependent data and platform independent data to key-value pairs, according to an example embodiment.

FIG. 5 is a flow chart of a method 500 performed by the server to convert platform dependent data and platform independent data to key-value pairs, according to an example embodiment. At 502, the server defines Extensible Markup Language (XML) labels as keys for key-value pairs based on the platform dependent data and platform independent data from each of the network devices. At 504, the server parses the received platform dependent data and platform independent data to assign a value to each of the keys. In some embodiments, if a value is not available for a key in the platform dependent data and platform independent data, a null value is assigned to the key.

Figure 6:
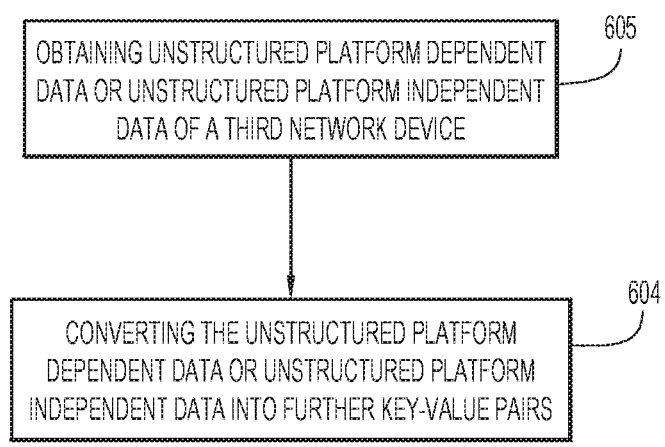
FIG. 6 is a flow chart illustrating a method for processing unstructured platform dependent data and/or unstructured platform independent data, according to an example embodiment.

FIG. 6 is a flow chart of a method 600 performed by the server for processing unstructured platform dependent data and/or unstructured platform independent data, according to an example embodiment. At 602, the server obtains unstructured platform dependent data and/or unstructured platform independent data of a third network device. The unstructured data may be stored in a remote database and include technical support data or quality assurance data. At 604, the server converts the unstructured platform dependent data or unstructured platform independent data into key-value pairs. The converted key-value pairs can also be used to train the software model to improve its accuracy in detecting inconsistency of configurations and states of network devices.

Figure 7:
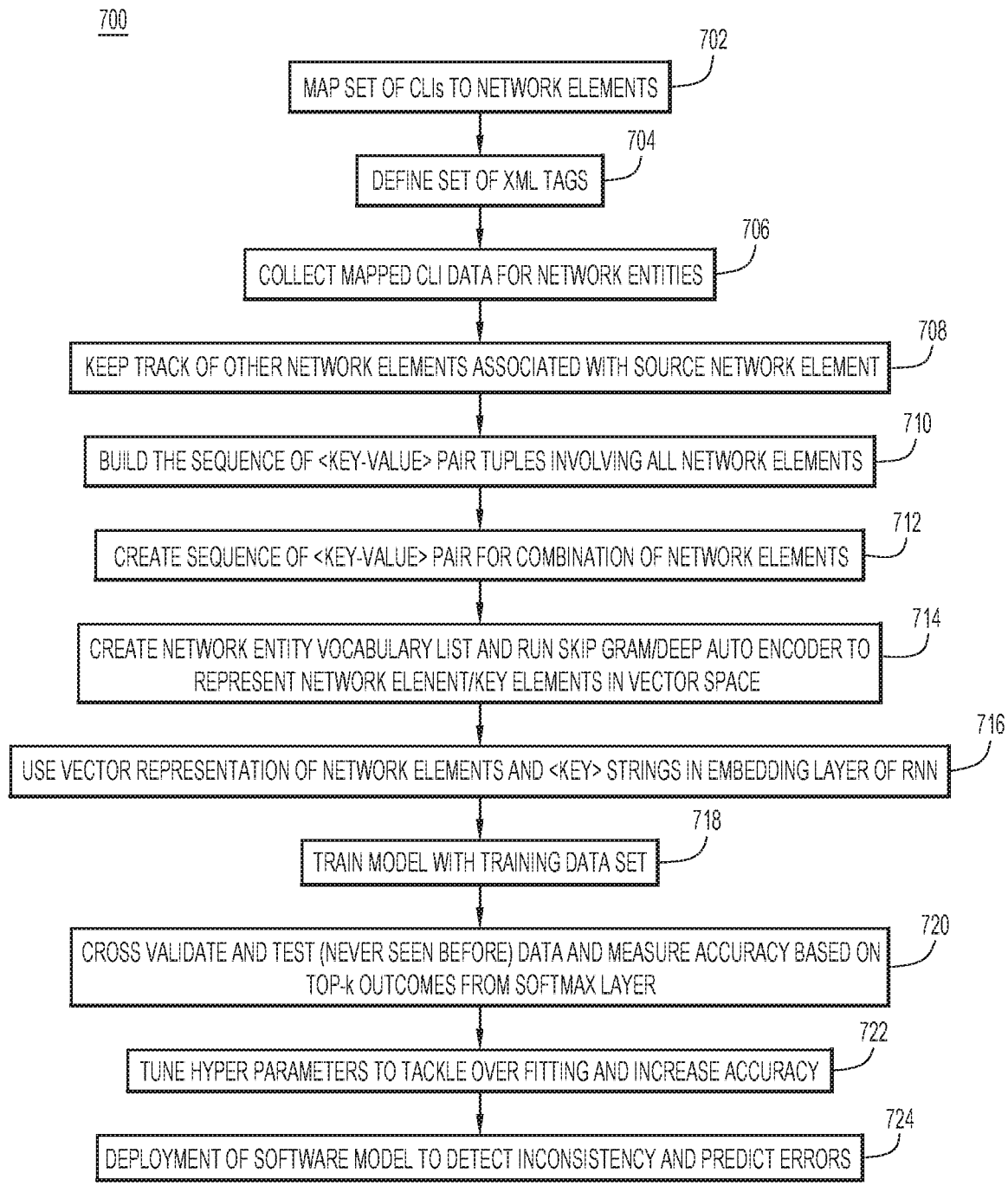
FIG. 7 is a detailed flow chart depicting operations for determining consistency of configurations and states of one or more network devices, according to an example embodiment.

FIG. 7 is a detailed flow chart of a method 700 for determining consistency of configurations and states of one or more network devices, according to an example embodiment. At 702, a set of CLIs is mapped to network elements, such as phy_port, ip-addr, switch virtual interface (svi), etc. At 704, a set of XML labels is defined as keys for key-value pairs that can be used to classify a sequence for a given network element. At 706, the mapped CLI data for network elements is collected from a system quality assurance testbed. The testbed may have an execution environment configured for testing and may include specific hardware, operation system (OS), network topology, configuration of the network devices under test, other application or system software. The XML labels and their associated values are parsed and extracted from the mapped data for forming one or more sequences of key-value pairs. When no value is present for an XML label, then a NULL value is assigned to that label.

At 708, other network elements are monitored and associated with a source network element. For example, when <ip-addr> is configured on <phyport>, these two network elements are deemed correlated and should be associated with each other.

At 710, sequences of key-value pairs/tuples involving all network elements are created. This is to prepare data to validate sequences for all involved network elements together. For example, if an IP address is associated with an ethernet interface, then a stale instance is present when this IP address is present in a hardware setting when an ethernet port is down. This stale instance results in the entire sequence having these key-value pairs being classified as erroneous. In some embodiments, it is not necessary to selectively pick labels because LSTM/GRU layer's "forget" gate(s) can be trained to remove irrelevant data.

At 712, sequences of key-value pairs are created for the combination of network elements and each sequence is assigned a classification value. These data can be stored in simple csv format or be integrated with a "big data" platform.

At 714, the entire data set including technical support data for training a software model is converted in the manner as described above. A network entity vocabulary list and run skip gram/deep auto-encoder may be created to represent network elements or keyed elements in vector space.

At 716, the above vector representation of network elements and key-value strings are used in an embedding layer of an RNN, e.g., a layer between an input layer and an LSTM/GRU layer.

At 718, a software model is trained with the training data set, which is supplied in a time series pattern to the RNN input layer. The hidden layers of the trained software model represent equivalent learned rules or decision trees associated with <key>-value pairs.

At 720, the trained model is cross validated and tested using new data that has not been applied to the model to measure accuracy based on top-k outcomes from the softmax layer. During the testing, learned weights/features can be used to predict the result, outcome, and overall accuracy. In one example, 60% of the collected network device data is used for training, 20% is used for cross validation, and the remaining 20% is used for testing. One of the goals is to classify sequences of <key>-value pairs with top k list of probabilities.

In some embodiments, at 722 the trained model is tuned to improve its accuracy. For example, hyper parameters of the model can be tuned to tackle over fitting issues.

At 724, the trained software model is deployed to detect inconsistency and predict errors of the configurations and states of network devices. Once trained, the software model can either be used as a standalone application or integrated with an analytics platform to trigger consistency check for network elements. The trained software model can be deployed to a network device, such as the consistency checker software 204a in the network device 200 depicted in FIG. 2. The trained software model can also be deployed to a network server, such as the consistency checker software 304a in the server 300 depicted in FIG. 3.

It should be understood that the sequence presented in the methods explained above may be modified and is not limited to those disclosed herein.

In one embodiment, an RNN is employed to train the software model with the collected data. Each <key>-value pair in an input sequence is associated with a specific time step. In effect, a number of time steps is equal to the maximum sequence length. The RNN shares the same hidden state weight (W) for its entire network. The RNN classifies a sequence based on prior context and present input. This operation is repeated across all data to complete the machine learning process. As a result, the trained model can be used to predict CC result for all kinds of network elements (e.g. ip addr, port, L2, etc.) when the data format for training and validating remains the same for all network elements.

In some embodiments, a trained model can be retrained each time new CC functionality is added for a new network element. In one embodiment, during the training period, a weight matrix within hidden units, hidden-output units, and input-hidden units can be learned and tuned along with LSTM/GRU gate layer output. During the testing period, the network with its associated network devices may remain unchanged so that the learned parameters can be used to predict the consistency outcome. In some embodiments, an F1 score can be calculated to ensure accuracy of the prediction. In some embodiments, hyper-parameters such as learning rate, regularization, number of hidden units etc. can be tuned to achieve higher accuracy, e.g., higher F1-scores.

Better accuracy can be achieved when using a skip-gram or deep auto-encoder model learning over entire data set and technical support data, which may be a one-time operation.

Thereafter, the learned distributed feature representation of network elements is supplied to embedding layer of the RNN. The hidden states of the trained model represent equivalent learned rules and decision trees associated with input <key>-value pairs.

In some embodiments, different network systems may include separate tables for programming network elements so that each data in a data set can be associated with its corresponding system. In one embodiment, because a sequence of a network element can be pre-defined and follows a specific code path, a software model can be pre-trained by data sequences, both in correct or incorrect constructions, from quality assurance testbed of a local system. The software model can also have the ability to learn sequences online when it is integrated with an existing analytics platform.

According to the techniques disclosed herein, with sufficient data samples, a software model can learn about relationships and constraints between key-value pairs in a sequence of a network element with respect to prior and future context. For example, if "<if_oper_state> up" and "<intf_ip> ip" are present in a sequence, the software model can learn and predict that "<ip_sw_show>" and "<ip_hw_show>" keys should also be present for any <ifname> value because these elements (e.g. eth1/1, eth1/2, port-channel100 etc.) are used in similar context and linearly aligned in a vector space.

Techniques presented herein using data driven Artificial Intelligence (AI) to validate run-time rules and detect software/hardware consistency errors for network elements in network device. As such, it provides improvements over conventional techniques that require programming and user-defined rules to classify software/hardware consistency errors. Techniques presented herein enable faster development for performing CC for any network elements.

In one embodiment, the trained model can be used in the network setup stage for initial triaging. The trained model can predict top-k probabilities of reasons behind failures for a given set of network elements. These techniques provide better capability to detect and diagnose issues associated with network elements.

Techniques presented herein can also solve the problem of CLI output churn. For example, the machine learning can use a mix of unsupervised and supervised techniques. Feature representations of network elements to a vector space is achieved by unsupervised neural network algorithms such as Restricted Boltzmann Machine, Deep autoencoder, Skipgram etc. In one embodiment, feature representation of network elements are learned automatically from raw CLI output and/or technical support data so that no manual feature engineering is needed. Weighting learned by hidden states of neural network represents a multidimensional vector for these network elements. The learned vector representation of network elements are then used to train the model for generalizing concepts and learning associated rules using RNN or Paragraph Vector technique. In some embodiments, this phase may need supervised training set to predict final outcome. During training period, the model is trained to memorize rules in its hidden state for a given set of context.

In some embodiments, because CLI output data and associated rules within network elements may vary after they are released and deployed, the model is to be trained with a mixture of offline and online training methodologies. Online machine learning is a method of machine learning in which data becomes available in a sequential order and is used to update a predictor for future data at each step, while offline machine learning uses batch learning techniques which generate the a predictor by learning the training data set at once. Online learning is employed when it is computationally infeasible to train over the entire data set, requiring the need of out-of-core algorithms. Online machine learning techniques are applicable to problems that involve data streams. Online machine learning techniques can dynamically adapt a model with new data without forgetting its existing knowledge so that the model can predict outcome from new data with its existing knowledge. If the model generates a false positive due to changes in the rules and/or facts, then intervention may be required to give the correct output. The model can be retrained with a new data set. If the model is integrated with an analytics platform, data visualization through a graphical user interface (GUI) can be used so that a user can make the changes before retraining model. These techniques enable a model to be incrementally trained. In one embodiment, a stochastic gradient descent with minimum batch optimization techniques can be used for online training.

A trained model is able to predict CC results for both streaming (structured) data from a network device and data obtained from technical support files, which are raw CLI command output and unstructured data.

In some embodiments, a training data set can be created using software telemetry in which structured streaming data format as key-value pairs, such as Google protocol buffer (GPB), is sent over Transmission Control Protocol (TCP) or User Datagram Protocol (UDP) from a network device. Each respective network element (e.g., ipfib, ufib, urib etc.) for IP address consistency check, can register with a software sensor, which streams relevant data in a predetermined (e.g., key-value GPB) format from a network device. A data collector can parse and store the streamed data into a non-structured query language (NOSQL) database (e.g., Elasticsearch/Mongo-DB) calling REpresentational State Transfer (REST) application programming interface (API). In some embodiments, a software application can be implemented to prepare a data set by joining fields from indices dedicated for network elements as described in operations 704, 708, and 712 depicted in FIG. 7. The data set is then used in operations 714-722 of FIG. 7 to train the model with the overall data set for any network element.

In one embodiment, a software sensor can collect relevant data from each respective application and/or a central database and build key-value pairs in the GPB format for a given network element. The software sensor can send the converted data to a data collector over TCP/UDP. The converted data can be supplied to an online machine learning model with batch normalization. The process continues until the model converges with global minimum using stochastic gradient techniques.

In some embodiments, a trained model can be integrated with an analytics application (app), either as an external app running outside of a network device or as an internal app running inside a network device. The model can convert raw data of a network element to a sequence of key-value pairs similar to the training data set and use the converted data to predict a CC outcome when the model is instructed to determine consistency of a given set of network element variables.

In some embodiments, the trained model can be used to predict consistency for data taken from technical support files. For example, CLI output from unstructured data can be converted to structured data format. In one embodiment, log analysis and NOSQL software e.g., Mongo-DB, Splunk, Elasticsearch-Logstash, etc., can be used to convert technical support files to JSON format. The converted data can be stored in a database in the same format as that used for training the model. When relevant technical support data becomes searchable, an analytics app can be used to create a sequence of key-value pairs and predict the consistency checking outcome for a given set of network element variables. These techniques are useful to debug issues offline from the technical support files where live setup is not available to debug reported issues.

There are many uses and advantages of the techniques presented herein. The techniques disclosed herein can reduce the time needed to develop production ready code for network devices, even with the lack of a common framework. The techniques can manage complex systems with inherent complexity in hardware programming and reduce inaccurate implementation of network devices. The techniques can be applied to detecting not only platform independent issues, but also platform dependent issues, e.g. duplicate/stale entries in hardware, etc. These techniques can combine consistency checks for multiple network elements, e.g., combining <ip> and <port> consistency check in case of an IP address being associated with an interface.

In one embodiment, these techniques can validate software and hardware fields for all elements of a network device, and also can validate logical rules that network elements should conform to for a given set of conditions/contexts. The techniques can widen the scope of the validation, resulting in better ability to detect inconsistency of the configurations and states of one or more network devices. In one form, these techniques can automate and be integrated with an analytics platform.

Although the embodiments and examples disclosed above use a specific construct of a network system, it is to be understood that the techniques disclosed herein can be applied to any network device and/or operating system. The format of data sequence as shown above is just for illustration purpose and does not limit the scope of this disclosure. Other modifications to the embodiments and examples are contemplated. Further, although RNN-based data modeling is illustrated herein, other software models can be employed to perform the machine learning process. Other data modelling algorithms such as Paragraph Vector can be used to model the data. Using sequences of key-value pairs to train a model not only can be applied to the RNN but also to other type of models.

In summary, in one form, a computer-implemented method is disclosed that includes: obtaining platform dependent data and platform independent data from each of a plurality of first network devices for a computer network environment, wherein the platform dependent data and platform independent data indicate device configurations and states of a respective first network device; converting the received platform dependent data and platform independent data to key-value pairs; creating sequences of the key-value pairs representing the configurations and states of the respective first network device; generating vectors for the sequences of the key-value pairs in a vector space; supplying the vectors to a model to train the model to learn relationships of the platform dependent data and platform independent data of each of the plurality of first network devices, to create a trained software model; and supplying to the trained software model platform dependent data and platform independent data from one or more second network devices to determine consistency of configurations and states of the one or more second network devices.

In another form, an apparatus is disclosed. The apparatus includes a network interface that enables network communications, a processor, and a memory to store data and instructions executable by the processor. The processor is configured to execute the instructions to: obtain platform dependent data and platform independent data from each of a plurality of first network devices for a computer network environment, wherein the platform dependent data and platform independent data indicate device configurations and states of a respective first network device; convert the received platform dependent data and platform independent data to key-value pairs; create sequences of the key-value pairs representing the configurations and states of the respective first network device; generate vectors for the sequences of the key-value pairs in a vector space; supply the vectors to a model to train the model to learn relationships of the platform dependent data and platform independent data of each of the plurality of first network devices, to create a trained software model; and supply to the trained software model platform dependent data and platform independent data from one or more second network devices to determine consistency of configurations and states of the one or more second network devices.

In yet another form, a non-transitory computer-readable storage media is encoded with software comprising computer executable instructions which, when executed by a processor, cause the processor to: obtain platform dependent data and platform independent data from each of a plurality of first network devices for a computer network environment, wherein the platform dependent data and platform independent data indicate device configurations and states of a respective first network device; convert the received platform dependent data and platform independent data to key-value pairs; create sequences of the key-value pairs representing the configurations and states of the respective first network device; generate vectors for the sequences of the key-value pairs in a vector space; supply the vectors to a model to train the model to learn relationships of the platform dependent data and platform independent data of each of the plurality of first network devices, to create a trained software model; and supply to the trained software model platform dependent data and platform independent data from one or more second network devices to determine consistency of configurations and states of the one or more second network devices.

The above description is intended by way of example only. Various modifications and structural changes may be made therein without departing from the scope of the concepts described herein and within the scope and range of equivalents of the claims.

What is claimed is:
1. A computer-implemented method comprising:
obtaining platform dependent data and platform independent data from each of a plurality of first network devices for a computer network environment, wherein the platform dependent data and platform independent data indicate device configurations and states of a respective first network device;
converting the platform dependent data and platform independent data to key-value pairs;
creating sequences of the key-value pairs representing the configurations and states of the respective first network device;
generating vectors for the sequences of the key-value pairs in a vector space;
supplying the vectors to a model to train the model to learn relationships of the platform dependent data and platform independent data of each of the plurality of first network devices, to create a trained software model;

supplying to the trained software model, platform dependent data and platform independent data from one or more second network devices; and predicting, based on operation of the trained software model on the platform dependent data and platform independent data from the one or more second network devices, consistency of configurations and states of the one or more second network devices.

2. The method of claim 1, further comprising:
obtaining the platform dependent data and platform independent data from each of the plurality of first network devices via command line interfaces.

3. The method of claim 1, wherein converting the platform dependent data and platform independent data to key-value pairs comprises:
defining Extensible Markup Language (XML) labels as keys for the key-value pairs; and
parsing the platform dependent data and platform independent data to assign a value to each of the keys.

4. The method of claim 3, further comprising:
if no value is present in the platform dependent data and platform independent data for a respective key, assigning a null value to the respective key.

5. The method of claim 1, wherein the trained software model learns relationships of a layer 2 networking parameter and a layer 3 networking parameter.

6. The method of claim 1, wherein the platform dependent data and platform independent data are structured data, the method further comprising:
obtaining unstructured platform dependent data or unstructured platform independent data of a third network device; and
converting the unstructured platform dependent data or unstructured platform independent data into further key-value pairs.

7. The method of claim 1, wherein predicting comprises predicting, based on operation of the trained software model on the platform dependent data and platform independent data from the one or more second network devices, one or more errors of configurations and states of the one or more second network devices.

8. An apparatus comprising:
a network interface that enables network communications;
a processor; and
a memory to store data and instructions executable by the processor,
wherein the processor is configured to execute the instructions to:
obtain platform dependent data and platform independent data from each of a plurality of first network devices for a computer network environment, wherein the platform dependent data and platform independent data indicate device configurations and states of a respective first network device;
convert the platform dependent data and platform independent data to key-value pairs;
create sequences of the key-value pairs representing the configurations and states of the respective first network device;
generate vectors for the sequences of the key-value pairs in a vector space;
supply the vectors to a model to train the model to learn relationships of the platform dependent data and platform independent data of each of the plurality of first network devices, to create a trained software model;
supply to the trained software model, platform dependent data and platform independent data from one or more second network devices; and
predict, based on operation of the trained software model on the platform dependent data and platform independent data from the one or more second network devices, consistency of configurations and states of the one or more second network devices.

9. The apparatus of claim 8, wherein the processor is further configured to:
obtain the platform dependent data and platform independent data from each of the plurality of first network devices via command line interfaces.

10. The apparatus of claim 8, wherein the processor is configured to convert the platform dependent data and platform independent data to key-value pairs by:
defining Extensible Markup Language (XML) labels as keys for the key-value pairs; and
parsing the platform dependent data and platform independent data to assign a value to each of the keys.

11. The apparatus of claim 10, wherein the processor is further configured to:
assign a null value to a respective key if no value is present in the platform dependent data and platform independent data for the respective key.

12. The apparatus of claim 8, wherein the trained software model learns relationships of a layer 2 networking parameter and a layer 3 networking parameter.

13. The apparatus of claim 8, wherein the platform dependent data and platform independent data are structured data, wherein the processor is further configured to:
obtain unstructured platform dependent data or unstructured platform independent data of a third network device; and
convert the unstructured platform dependent data or unstructured platform independent data into further key-value pairs.

14. The apparatus of claim 8, wherein the processor is configured to:
predict, based on operation of the trained software model on the platform dependent data and platform independent data from the one or more second network devices, one or more errors of configurations and states of the one or more second network devices.

15. A non-transitory computer-readable storage media encoded with software comprising computer executable instructions which, when executed by a processor, cause the processor to:
obtain platform dependent data and platform independent data from each of a plurality of first network devices for a computer network environment, wherein the platform dependent data and platform independent data indicate device configurations and states of a respective first network device;
convert the platform dependent data and platform independent data to key-value pairs;
create sequences of the key-value pairs representing the configurations and states of the respective first network device;
generate vectors for the sequences of the key-value pairs in a vector space;
supply the vectors to a model to train the model to learn relationships of the platform dependent data and platform independent data of each of the plurality of first network devices, to create a trained software model;

supply to the trained software model platform, dependent data and platform independent data from one or more second network devices; and predict, based on operation of the trained software model on the platform dependent data and platform independent data from the one or more second network devices, consistency of configurations and states of the one or more second network devices.

16. The non-transitory computer-readable storage media of claim 15, wherein the instructions cause the processor to:
obtain the platform dependent data and platform independent data from each of the plurality of first network devices via command line interfaces.

17. The non-transitory computer-readable storage media of claim 15, wherein the instructions that are operable to cause the processor to convert the platform dependent data and platform independent data to key-value pairs comprises instructions that cause the processor to:

define Extensible Markup Language (XML) labels as keys for the key-value pairs; and parse the platform dependent data and platform independent data to assign a value to each of the keys.

18. The non-transitory computer-readable storage media of claim 17, wherein the instructions cause the processor to:
if no value is present in the platform dependent data and platform independent data for a respective key, assign a null value to the respective key.

19. The non-transitory computer-readable storage media of claim 15, wherein the trained software model learns relationships of a layer 2 networking parameter and a layer 3 networking parameter.

20. The non-transitory computer-readable storage media of claim 15, wherein the instructions cause the processor to:
predict, based on operation of the trained software model on the platform dependent data and platform independent data from the one or more second network devices, one or more errors of configurations and states of the one or more second network devices.

* * * * *